J. M. KERST.
COMPRESSION STOP AND WASTE VALVE.
APPLICATION FILED AUG. 19, 1910.

980,793.

Patented Jan. 3, 1911.

Witnesses:
Walter Chisim
Willa A. Burrowes

Inventor:
John M. Kerst,
by his Attorneys,
Howson & Howson

UNITED STATES PATENT OFFICE.

JOHN M. KERST, OF GLENSIDE, PENNSYLVANIA, ASSIGNOR TO WOODWARD & WANGER, OF PHILADELPHIA, PENNSYLVANIA, A FIRM.

COMPRESSION STOP AND WASTE VALVE.

980,793.   Specification of Letters Patent.   Patented Jan. 3, 1911.

Application filed August 19, 1910.   Serial No. 577,944.

*To all whom it may concern:*

Be it known that I, JOHN M. KERST, a citizen of the United States, and a resident of Glenside, Montgomery county, Pennsylvania, have invented certain Improvements in Compression Stop and Waste Valves, of which the following is a specification.

My invention relates to valves of the type designed to drain pipe lines employed for carrying liquid after such valves have been closed; and the object of my invention is to provide the waste drain passages of such valves with retaining means for the nuts usually employed to cut off the flow through said waste drain passages.

Figure 1:
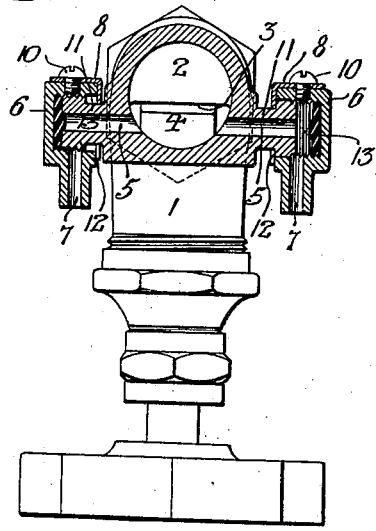
Figure 2:
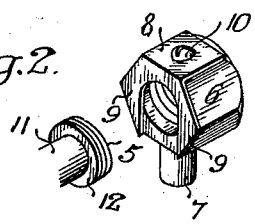
Figure 3:
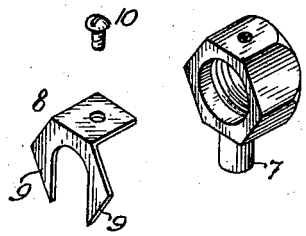

This and other objects of my invention are more particularly referred to hereinafter, reference being had to the accompanying drawings, in which:

Figure 1, is a sectional view of a valve of the type to which the device forming the subject of my invention is applicable; Fig. 2, is a detached perspective view of one of the nuts carrying the retaining means forming the subject of my invention, and Fig. 3, is a view showing the parts illustrated in Fig. 2, detached.

In the drawings, 1 represents the casing of an ordinary compression stop and waste valve which may be placed in any suitable pipe line designed to carry liquids. This valve structure has the usual chamber 2, with apertured wall 3, closed by a valve proper 4, and leading from said chamber 2 are waste passages 5, normally closed when the valve is open for free passage of liquid through the pipe line in which it is connected. The closing means, usually consist of some form of nut. In the present instance cap nuts 6 are provided carrying apertured tubular stems 7 so that when said nuts are backed off, liquid from the passages 5 may drain through the same and discharge from the valve casing.

Much trouble has been experienced in the employment of valves of this character, owing to the fact that heretofore the nuts were readily detachable and hence frequently came off in the hands of the operator if carelessly handled, with consequent loss. To permit such opening of the drain passages as will insure complete drainage and to avoid removal of these nuts when the same are backed off, I provide retaining means in the shape of clips 8 having a depending bifurcated portion forming retaining arms 9; such clips being held to the nuts by suitable screws 10.

The stems having the waste passages 5 may be reduced at 11, and after the nut has been set on the threaded end of said stems, the retaining clip is dropped in place in the manner shown, finding a seat behind a shoulder 12 formed by the threaded portion of said stems, and it is then secured to the nut by the screws 10.

To insure against leakage when the nuts are turned up to close the drain passages, washers 13 may be provided; such washers being preferably carried by the nuts in the manner illustrated in the drawing.

I claim—

1. The combination of a valve casing having a stem with a waste outlet passage, said stem being threaded, the threaded portion forming a shoulder, a nut adapted to said threaded portion, and retaining means carried by said nut in engagement with the shoulder formed by the threaded portion of the stem.

2. The combination of a valve casing having stems with waste outlet passages, said stems being threaded, the threaded portions forming shoulders, nuts adapted to said threaded portions, and retaining clips carried by said nuts in engagement with the shoulders formed by the threaded portions of the stems.

3. The combination of a valve casing having stems with waste outlet passages, said stems being threaded, the threaded portions forming shoulders, nuts adapted to said threaded portions, clips carried by said nuts, and retaining arms or fingers carried by said clips and arranged to lie behind the shoulders formed by the threaded portions of the stems to prevent removal of the nuts.

In testimony whereof, I have signed my name to this specification, in the presence of two subscribing witnesses.

JOHN M. KERST.

Witnesses:
W. T. STEEL,
E. GEFFEN.